United States Patent
Nakazawa

(10) Patent No.: US 8,332,089 B2
(45) Date of Patent: Dec. 11, 2012

(54) TRAVEL CONTROLLER FOR WORK VEHICLE

(75) Inventor: Shunichi Nakazawa, Saitama (JP)

(73) Assignee: Kabushiki Kaisha Aichi Corporation (JP)

( * ) Notice: Subject to any disclaimer, the term of this patent is extended or adjusted under 35 U.S.C. 154(b) by 281 days.

(21) Appl. No.: 12/663,251

(22) PCT Filed: Jul. 31, 2008

(86) PCT No.: PCT/JP2008/063736
§ 371 (c)(1),
(2), (4) Date: May 20, 2010

(87) PCT Pub. No.: WO2009/020034
PCT Pub. Date: Feb. 12, 2009

(65) Prior Publication Data
US 2011/0060488 A1    Mar. 10, 2011

(30) Foreign Application Priority Data

Aug. 6, 2007   (JP) ................. 2007-203770
Aug. 6, 2007   (JP) ................. 2007-203772
Dec. 27, 2007  (JP) ................. 2007-337272
Dec. 27, 2007  (JP) ................. 2007-337273

(51) Int. Cl.
    *B60L 15/20*    (2006.01)

(52) U.S. Cl. ........................................ 701/22

(58) Field of Classification Search ............... 180/65.1, 180/65.8, 411; 701/22; 182/14, 16, 63.1, 182/69.5, 69.6, 148; 280/32.5; 52/109
See application file for complete search history.

(56) References Cited

U.S. PATENT DOCUMENTS

| | | | | |
|---|---|---|---|---|
| 3,961,681 A * | 6/1976 | Fisher | | 180/305 |
| 4,449,600 A * | 5/1984 | Telfer | | 180/437 |
| 7,957,866 B2 * | 6/2011 | Oba et al. | | 701/41 |
| 7,958,960 B2 * | 6/2011 | Mizutani et al. | | 180/65.51 |
| 2003/0158635 A1 * | 8/2003 | Pillar et al. | | 701/1 |
| 2006/0185926 A1 * | 8/2006 | Simard et al. | | 180/409 |

FOREIGN PATENT DOCUMENTS

| | | |
|---|---|---|
| JP | 47-14613 | 8/1972 |
| JP | 48-26332 | 8/1973 |

(Continued)

OTHER PUBLICATIONS

International Search Report; PCT/JP2008/063736; Nov. 18, 2008.

*Primary Examiner* — Joseph Rocca
(74) *Attorney, Agent, or Firm* — Studebaker & Brackett PC; Donald R. Studebaker

(57) ABSTRACT

A vehicle 1 used for work at elevated locations comprises a travel body 10, whose front wheels 11a, 11b are drive wheels, a steering cylinder 17, two travel motors 12, a battery B, an inverter IV, a travel operation lever 41, and a steering dial 42. In the vehicle, the steering cylinder 17 drives a steering mechanism 13, which directs the drive wheels 11a, 11b, to change the steering angle of the drive wheels 11a, 11b, and the travel motors 12a, 12b, which receive electric power from the battery B, respectively, drive the drive wheels 11a, 11b. The inverter IV converts DC power from the battery B to AC power, which is supply to the travel motors 12a, 12b to drive the rotation of both the drive motors. The travel operation lever 41 is operated for travel control while the steering dial 42 is operated to steer the travel body 10. The vehicle further comprises a steering control unit 53 and an inverter control unit 51. The steering control unit 53 controls the operation of the steering cylinder 17, so that the steering angle of the drive wheels corresponds to the operation of the steering dial 42, and the inverter control unit 51 controls the operation of the inverter IV to rotate the travel motors 12a, 12b at a speed that corresponds to the operation of the travel operation lever 41.

16 Claims, 12 Drawing Sheets

FOREIGN PATENT DOCUMENTS

| | | |
|---|---|---|
| JP | 06-233409 | 8/1994 |
| JP | 07-101698 | 4/1995 |
| JP | 2001-028804 | 1/2001 |
| JP | 2006-335216 | 12/2006 |
| JP | 2007-099439 | 4/2007 |
| WO | WO 2007064025 A1 * | 6/2007 |

* cited by examiner

FIG. 9

| PATTERN NAME | CONTROL PATTERN A | CONTROL PATTERN B | CONTROL PATTERN C | CONTROL PATTERN D |
|---|---|---|---|---|
| | 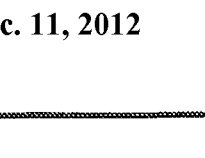 | 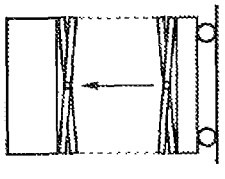 | 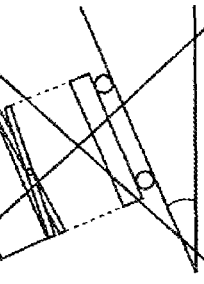 | 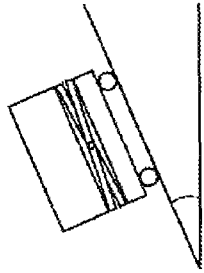 |
| TILT ANGLE | SMALLER THAN PREDETERMINED ANGLE (FLAT GROUND) | EQUAL TO OR LARGER THAN PREDETERMINED ANGLE (SLOPED GROUND) | SMALLER THAN PREDETERMINED ANGLE (FLAT GROUND) | EQUAL TO OR LARGER THAN PREDETERMINED ANGLE (SLOPED GROUND) |
| RETRACTION STATE | ○ | ○ | × | × |
| RUNNING CONDITION | HIGH SPEED TRAVEL IS POSSIBLE | LOW SPEED TRAVEL IS POSSIBLE | LOW SPEED TRAVEL IS POSSIBLE | TRAVEL IS NOT POSSIBLE |

- CUTBACK FUNCTION IS ACTIVATED
- NEGATIVE BRAKE IS ACTIVATED

TRAVEL CONTROLLER FOR WORK VEHICLE

TECHNICAL FIELD

The present invention relates to a work vehicle comprising a travel controller, the right and left wheels of which vehicle are driven by battery-powered induction motors, and particularly to a work vehicle whose induction motors are controlled through an inverter.

TECHNICAL BACKGROUND

There are various forms of automotive work vehicles that are used for transportation work in factories or for interior work in buildings. However, there is known a work vehicle that comprises a relatively small travel body with front and rear and right and left wheels, an elevating device (for example, a scissors-linkage or a telescopic motion column) provided on the travel body, and an aerial platform mounted on the elevating device, which is actuated to extend and contract itself in the up and down direction for lifting and lowering the aerial platform. In such a work vehicle, the operator who is onboard on the aerial platform can operate the movement of the travel body and the up and down of the aerial platform (refer, for example, to patent reference 1).

Patent reference 1: Japanese Laid-Open Patent Publication No. 2007-99439

DISCLOSURE OF THE INVENTION

Problems to be Solved by the Invention

Exhaust gas and noise should be avoided especially indoors, so an indoor-type work vehicle of the above mentioned construction is preferably designed with induction motors (travel motors), which are provided at the right and left drive wheels, respectively, with a battery built in the travel body as electrical power source. However, the capacity of the battery has a limit, and the recharging of the battery requires a certain facility and a time. As a result, it is not convenient for the work vehicle that the battery should come into need of being recharged, once the vehicle has started traveling or the day's work. To effectively reduce the consumption of electrical energy in a battery-powered work vehicle, each induction motor is provided with an inverter, so that the operation of each of the induction motors is independently controlled through the respective inverter to achieve its optimal rotational speed, in response to the changing travel condition of the work vehicle. However, there are problems that this control is much complicated because an inverter is provided for each induction motor and that this complication leads to a high manufacturing cost.

The present invention aims at solving these problems, and it is the objective of the invention to provide a work vehicle whose wheels are driven by induction motors powered by a battery and controlled through an inverter by a simplified control, and thereby achieving a low manufacturing cost, and yet, efficient use of electrical power from the battery.

Means to Solve the Problems

To solve the above mentioned problems, a work vehicle according to the present invention (for example, an aerial platform vehicle 1, which is used for work at elevated locations, described in the preferred embodiment section) comprises wheels on its front and rear, and right and left sides, a steering actuator (for example, a steering cylinder 17 described in the preferred embodiment), two induction motors (for example, travel motors 12a, 12b described in the preferred embodiment), a battery for providing electric power to the two induction motors, an inverter, travel-operating means (for example, a travel operation lever 41 described in the preferred embodiment), steering-operating means (for example, a steering dial 42 described in the preferred embodiment), steering-controlling means, and inverter-controlling means. In the vehicle, the steering actuator drives a link mechanism that directs a pair of right and left drive wheels and thereby changes steering angles at the drive wheels, and the two induction motors independently drive the pair of right and left drive wheels, respectively. The inverter converts DC power from the battery to AC power, and supplies the AC power to the two induction motors for driving both the induction motors to rotate. The travel-operating means is operated for travel control of a travel body, i.e., the body of the vehicle, and the steering-operating means is operated to set a turning direction for the travel body. The steering-controlling means controls the operation of the steering actuator such that the steering angle of the drive wheels correspond to the operation of the steering-operating means, and the inverter-controlling means controls the operation of the inverter to rotate the induction motors at a speed that corresponds to the operation of the travel-operating means.

In a work vehicle in this configuration, one inverter integrally controls the operation of the two induction motors for driving the wheels. Thus, this design achieves simplification and cost-efficiency for control system. Furthermore, the two induction motors are operated, through the inverter, at optimal rotational speed that corresponds to the operation of the operating means. As a result, this design also achieves efficient use of electricity and extends the period of use of the aerial platform vehicle available on a single charge.

It is preferable that a work vehicle in the above configuration comprise steering-angle-detecting means, which detects steering angles at the drive wheels. In this case, if a steering is detected by the steering-angle-detecting means (for example, if the steering angle at the drive wheels becomes equal to or larger than a predetermined angle), then the inverter-controlling means controls the operation of the induction motors through the inverter such that the motors acquire a characteristic that their torque output changes more gradually than otherwise over a corresponding rotational speed change.

In this case, it is preferable that the inverter-controlling means control the operation of the induction motors through the inverter such that the motors acquire a characteristic that their torque output changes more gradually over a corresponding rotational speed change as the difference in rotational speed between the inner and outer wheels of the drive wheels becomes larger, which difference corresponds to the steering angle at the drive wheels detected by the steering-angle-detecting means.

It is more preferable that the vehicle further comprise temperature-detecting means, which is attached to these two induction motors and which detects the temperature of the windings of the induction motors. In this case, the inverter-controlling means controls the operation of the induction motors through the inverter such that the induction motors acquire a characteristic that their torque output changes more gradually over a corresponding rotational speed change as the temperature of the windings of the motors detected by the temperature-detecting means becomes lower.

By controlling the operation of the induction motors through the inverter such that the motors acquire a characteristic that their torque output changes more gradually for a corresponding rotational speed change during a steering (so-called re-boost control), the difference in torque that results from the difference in rotational speed between the inner and outer wheels during the steering is minimized for smooth turning, which leads to good drivability. This results in efficient use of electricity, which extends the period of use of the aerial platform vehicle available on a single charge. In addition, during the steering, the torque output of the induction motors is reduced by the re-boost control. However, the speed of the vehicle falls from that in straight travel because travel resistance remains unchanged. This is preferable on the point of safety.

It is preferable that the above described work vehicle further comprise tilt-angle-detecting means, which detects the tilt angle of the travel body, and motor-temperature-detecting means, which detects the temperature of the windings of the induction motors. In this case, while the tilt angle detected by the tilt-angle-detecting means is equal to or larger than a predetermined angle, if the temperature of the windings of the induction motors detected by the motor-temperature-detecting means is higher than a predetermined upper limit for allowable temperature, then the inverter-controlling means restricts the rotation of the induction motors, whose operation is otherwise controlled in correspondence to the operation of the travel-operating means.

In this case, although the travel-operating means outputs a travel command value in correspondence to its operation, while the tilt angle detected by the tilt-angle-detecting means is equal to or larger than a predetermined angle, if the temperature of the windings of the induction motors detected by the motor-temperature-detecting means is higher than a predetermined upper limit for allowable temperature, then the inverter-controlling means restricts the frequency of the alternating current that is set based on the travel command value, in correspondence to the detected temperature of the windings of the induction motors, and sets this restricted frequency as a command frequency.

While the tilt angle of the travel body is equal to or higher than a predetermined angle, if the temperature of the windings of the induction motors becomes higher than a predetermined upper limit for allowable temperature, then the frequency that is set based on the travel command value is restricted in correspondence to the temperature of the windings of the induction motors, and this restricted frequency is set as the command frequency. This is a so-called cutback function, and it prevents malfunction of the induction motors and also prevents the travel body from deviating while the vehicle is traveling over a sloped ground. This is an improvement in work safety.

It is preferable that the above described work vehicle further comprise an elevating device, which is provided on the travel body and is extended upward or contracted downward for realizing ascending and descending motions, and retraction-detecting means, which detects whether the elevating device is retracted on the travel body or not. In this case, while the tilt angle detected by the tilt-angle-detecting means is equal to or larger than a predetermined angle, and while the retraction of the elevating device is detected by the retraction-detecting means, if the temperature of the windings of the induction motors detected by the motor-temperature-detecting means is higher than a predetermined upper limit for allowable temperature, then the inverter-controlling means restricts the frequency of the alternating current that is set based on the travel command value, in correspondence to the detected temperature of the windings of the induction motors, and sets this restricted frequency as the command frequency. This arrangement adds a condition that the elevating device is retracted on the travel body, to the cutback function, which works in correspondence to the temperature of the windings of the induction motors while the vehicle is traveling over a sloped ground. Therefore, safety in carrying out work is improved.

It is more preferable that the above work vehicle comprise motor-current-detecting means, which detects electrical currents through the induction motors. In this case, while the tilt angle detected by the tilt-angle-detecting means is equal to or larger than a predetermined angle, if the electrical current values of the induction motors detected by the motor-current-detecting means are lower than the lower limit for allowable electrical current value, which limit is predetermined in correspondence to the tilt angle, then the inverter-controlling means stops the operation of the inverter. This is a work-safety measure to stop the operation of the induction motors for preventing the vehicle from deviating over a sloped ground, which deviation may occur if the induction motors experience a deficiency in torque-generating electrical current under the cutback function.

It is even more preferable that the above work vehicle further comprise an elevating device, which is provided on the travel body and is extended upward or contracted downward for realizing ascending and descending motions, and retraction-detecting means, which detects whether the elevating device is retracted on the travel body or not. In this case, while the tilt angle detected by the tilt-angle-detecting means is equal to or larger than a predetermined angle, and while the retraction of the elevating device is detected by the retraction-detecting means, if the electrical current value of the induction motors detected by the motor-current-detecting means is lower than the lower limit for allowable electrical current value, which limit is predetermined in correspondence to the tilt angle, then the inverter-controlling means stops the operation of the inverter. This arrangement sets a condition that the elevating device should be retracted on the travel body before the operation of the inverter is stopped when the electrical current value of the induction motors becomes lower than the lower limit for allowable current value while the vehicle is traveling over a sloped ground. This is a further work-safety improvement.

Additionally, it is preferable that the work vehicle comprise braking means, which restrains at least one of the front or rear pair of right and left wheels from rotating when the inverter-controlling means stops the operation of the inverter. This arrangement is a further work-safety improvement, which prevents the vehicle from rolling back by activating the braking means (so-called negative brake) and thereby stopping the rotation of the wheels when the operation of the inverter is stopped, i.e., the operation of the induction motors is stopped because the electrical current value of the motors has become lower than the lower limit while the vehicle is traveling over a sloped ground.

BRIEF DESCRIPTION OF THE DRAWINGS

FIG. 9 is a table describing control patterns A through D, which are executed by the inverter control unit.

DESCRIPTION OF THE PREFERRED EMBODIMENTS

Figure 1:
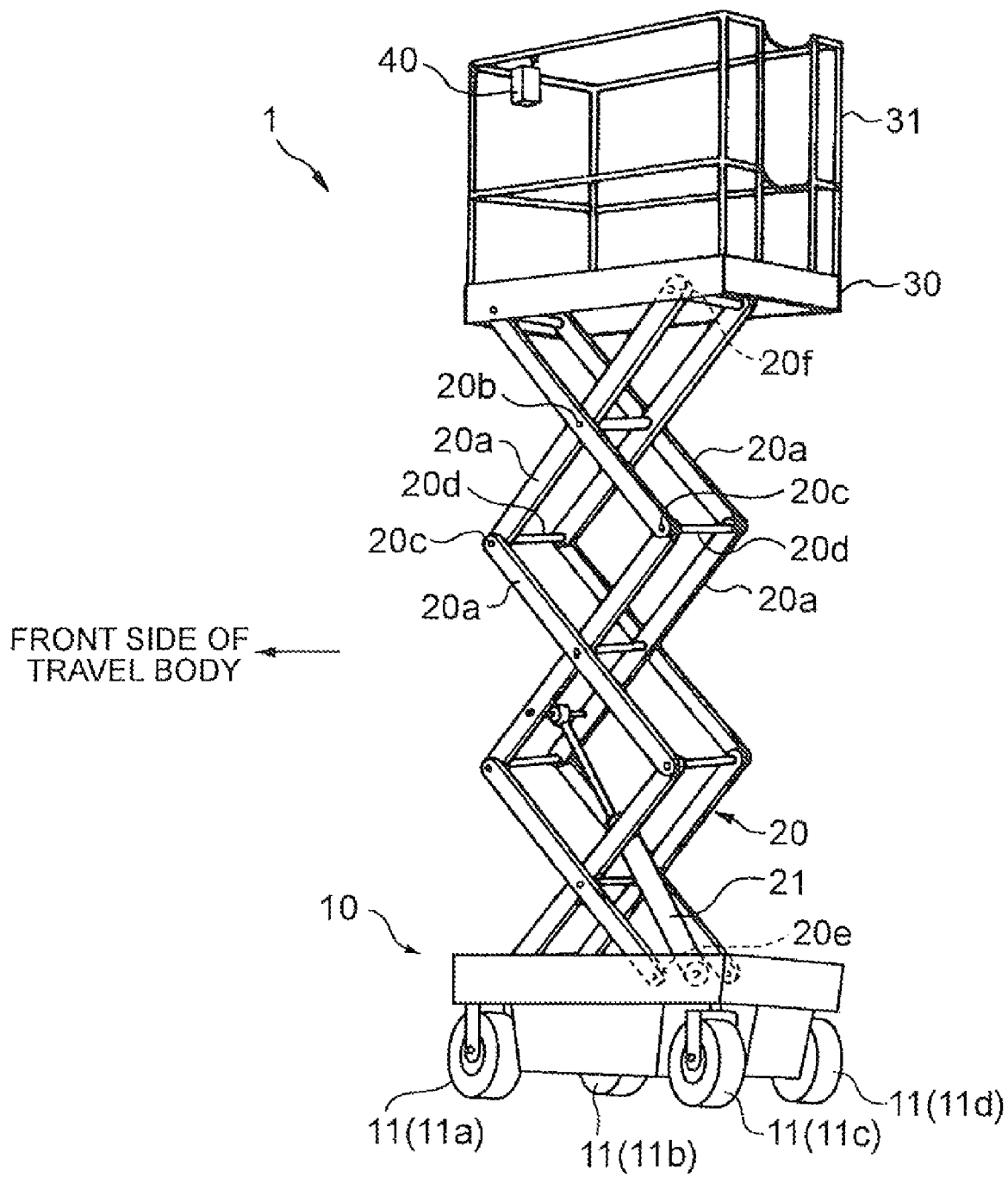
FIG. 1 is a perspective view of an aerial platform vehicle according to the invention.

Now, an embodiment of the invention is described with reference to these drawings. An aerial platform vehicle 1 according to the present invention is a so-called vertically ascending and descending vehicle used for work at elevated locations and comprises, as shown in FIG. 1, a travel body 10 capable of traveling on four tire wheels 11, which are provided on the front and rear and right and left sides, a scissors-linkage 20 provided on the upper part of the travel body 10, and an aerial platform 30 supported by the scissors-linkage 20 for a worker to ride.

A pair of left and right front wheels 11a, 11b of the tire wheels 11 (hereinafter, the left front wheel is referred to with alphanumeric 11a, and the right front wheel with 11b) are the wheels that are used for driving and steering the vehicle. For driving the front pair of left and right wheels 11a, 11b independently from each other, two travel motors (induction motors) 12a, 12b (hereinafter, the left travel motor is referred to with alphanumeric 12a, and the right travel motor with 12b; refer to FIG. 2) are correspondingly built in the travel body 10. While the front pair of left and right wheels 11a, 11b are driven each by the respective travel motors 12a, 12b, these wheels 11a, 11b are turned to steer the vehicle to a desirable direction (refer to FIG. 3). The travel motors 12a, 12b are provided integrally with so-called negative brakes 14, each of which stops the rotation of and locks the rotational axis of the corresponding motor. The rear pair of left and right wheels 11c, 11d (hereinafter, the left rear wheel is referred to with alphanumeric 11c, and the right rear wheel with 11d) are non-driven wheels and are mounted, respectively, on a shaft 19 (refer to FIG. 3) that protrudes on the right and left sides of the travel body 10.

Figure 8:
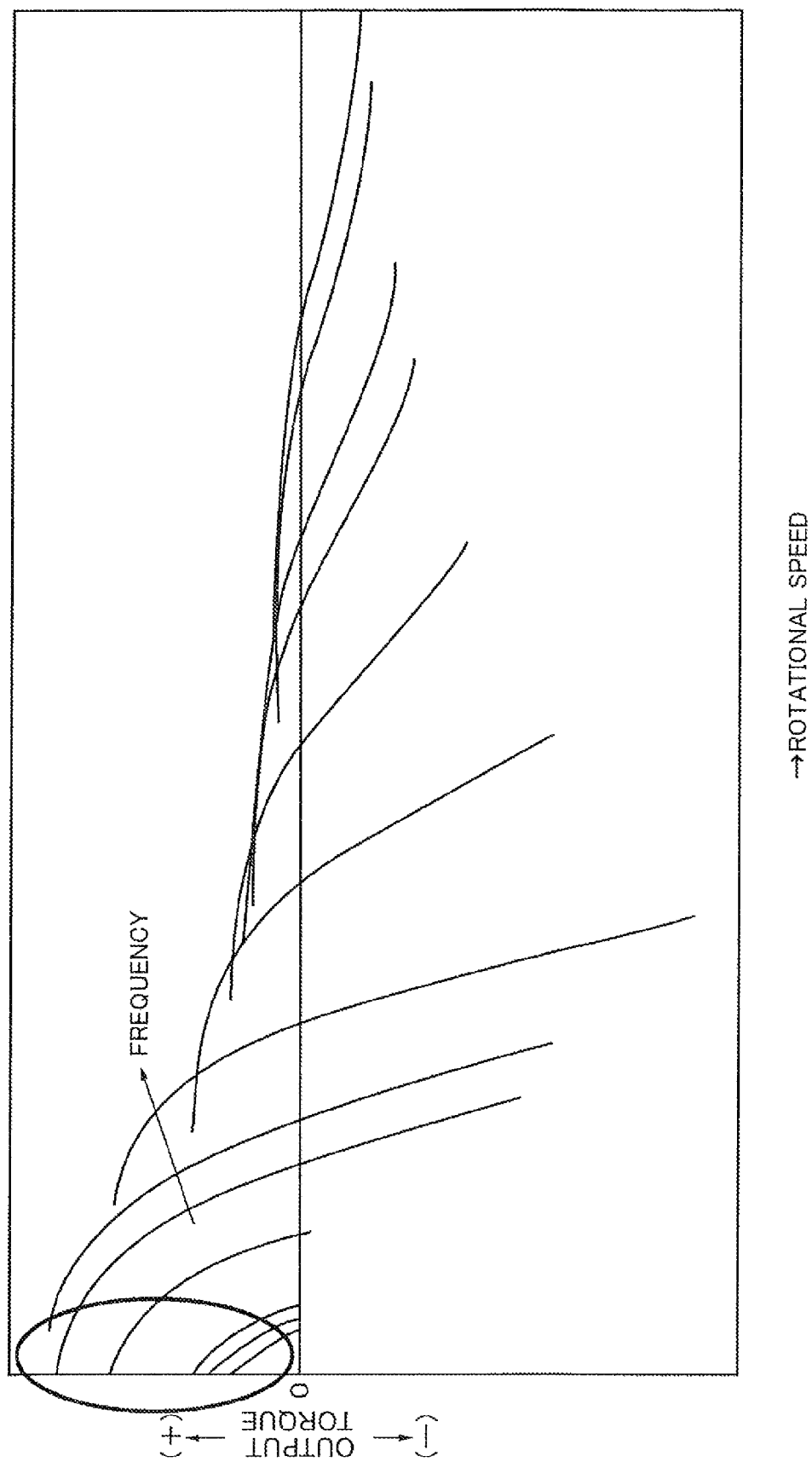
FIG. 8 is a graph illustrating output characteristics of the travel motor.

In this embodiment, the travel motors 12a, 12b have a characteristic that a relatively small torque difference results from the difference in rotational speed between the inner wheel and the outer wheel during the steering of the vehicle and that energy in the battery B is used efficiently with relatively small starting torque in lower frequency band (at the time of no load) as indicated by a circle in FIG. 8.

The scissors-linkage 20 comprises a plurality of link members 20a, every two members of which are connected centrally with pivots 20b in an "X" figure. These link members are provided in plurality upwardly on the right and left sides of the travel body 10. The lower end of a respective link member 20a positioned above and the upper end of a respective link member 20a positioned below are connected with each other by a pivot 20c while the link members 20a positioned on the right side and those positioned on the left side are connected with each other by link rods 20d, which extend horizontally in the right and left direction with respect to the travel body 10. Furthermore, in the scissors-linkage 20, the lower ends of the link members 20a positioned lowest on the front side of the travel body 10 are connected pivotally to the upper part of the travel body 10 while those of the link members 20a positioned lowest on the rear side are provided with rollers 20e, which roll along the rails (not shown) provided on the upper part of the travel body 10. Moreover, in the scissors-linkage 20, the upper ends of the link members 20a positioned highest on the front side of the travel body 10 are connected pivotally to the lower part of the aerial platform 30 while those of the link members 20a positioned highest on the rear side are provided with rollers 20f, which roll along the rails (not shown) provided on the lower part of the aerial platform 30. The scissors-linkage 20, which is constructed as described above, is extended and contracted by an ascent and descent cylinder 21, which is provided between the mechanism 20 and the travel body 10, for moving the aerial platform 30 upward and downward.

The aerial platform 30 is provided with a balustrade 31 for protection of the worker aboard from falling and with a control box 40, which is attached to the balustrade. The control box 40 includes a travel operation lever 41 for switching the state of the travel body 10 between start and stop, and forward and backward, a steering dial 42 for steering the travel body 10 (i.e., for directing the front wheels 11a, 11b) while the vehicle is traveling, and an ascent and descent operation lever 43 for lifting and lowering the aerial platform 30 (refer to FIG. 2). As a result, the worker who is on the aerial platform 30 can operate the travel operation lever 41, steering dial 42 and ascent and descent operation lever 43 to control the traveling of the travel body 10 and the ascent and descent of the aerial platform 30 for the purpose of reaching a desirable location and position.

Figure 3:
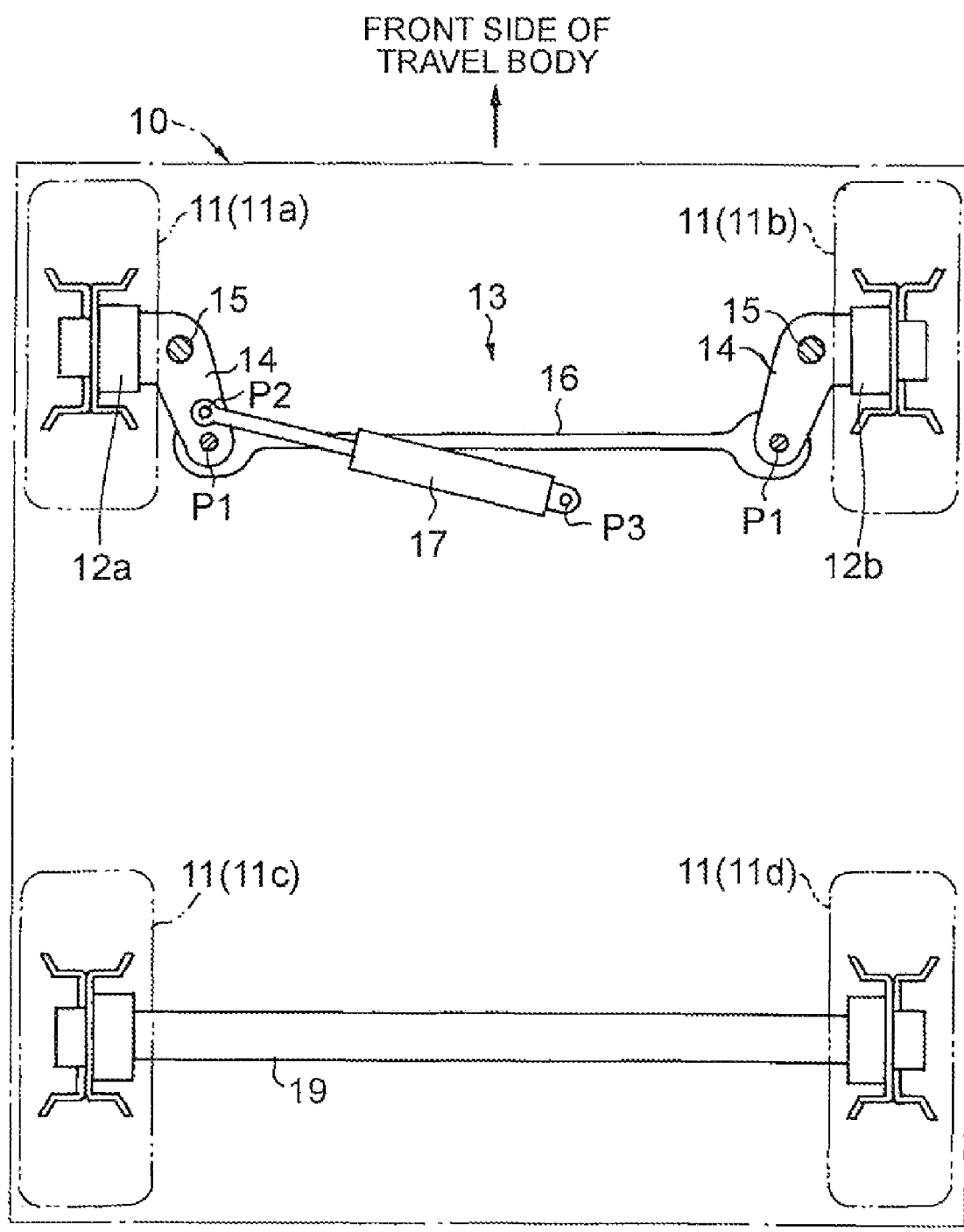
FIG. 3 is a plan view illustrating the configuration of a steering device provided in the vehicle.
Figure 4A:
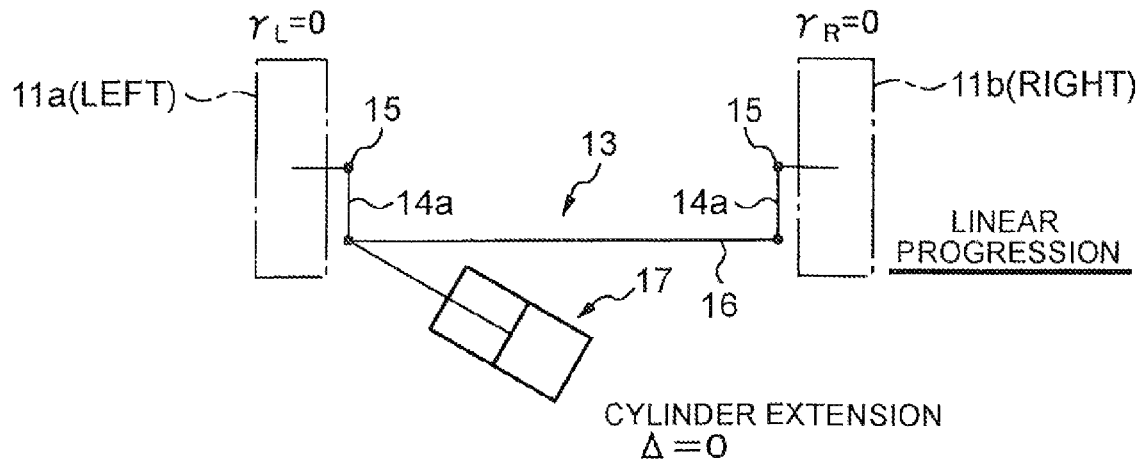
FIG. 4 are diagrams illustrating the relation between the extension of the steering cylinder and the steering angle at the front wheels in the vehicle, FIG. 4A showing a condition where the extension of the steering cylinder is zero, FIG. 4B showing a condition where the extension of the steering cylinder has a positive value, and FIG. 4C showing a condition where the extension of the steering cylinder has a negative value.
Figure 4B:
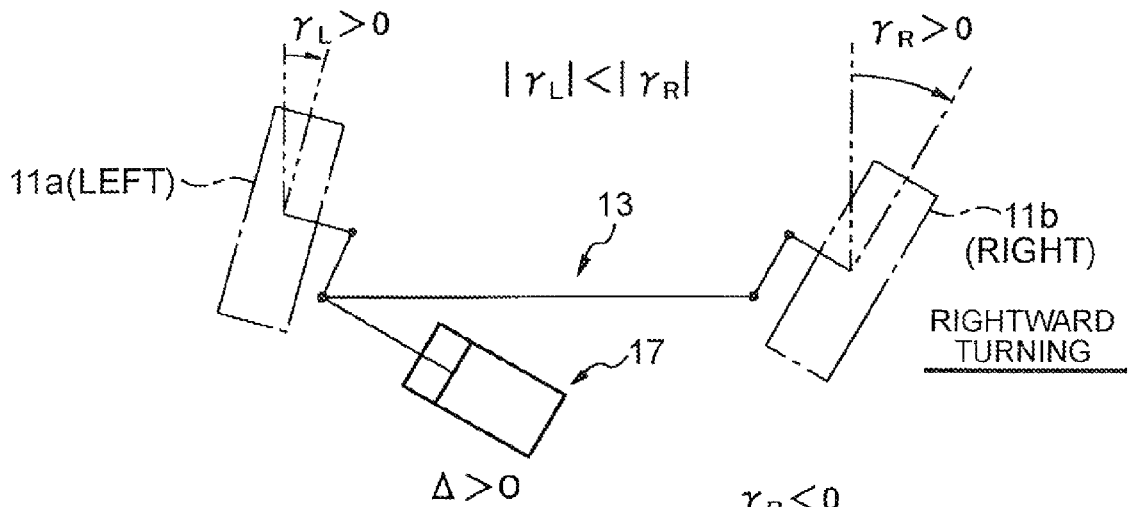
Figure 4C:
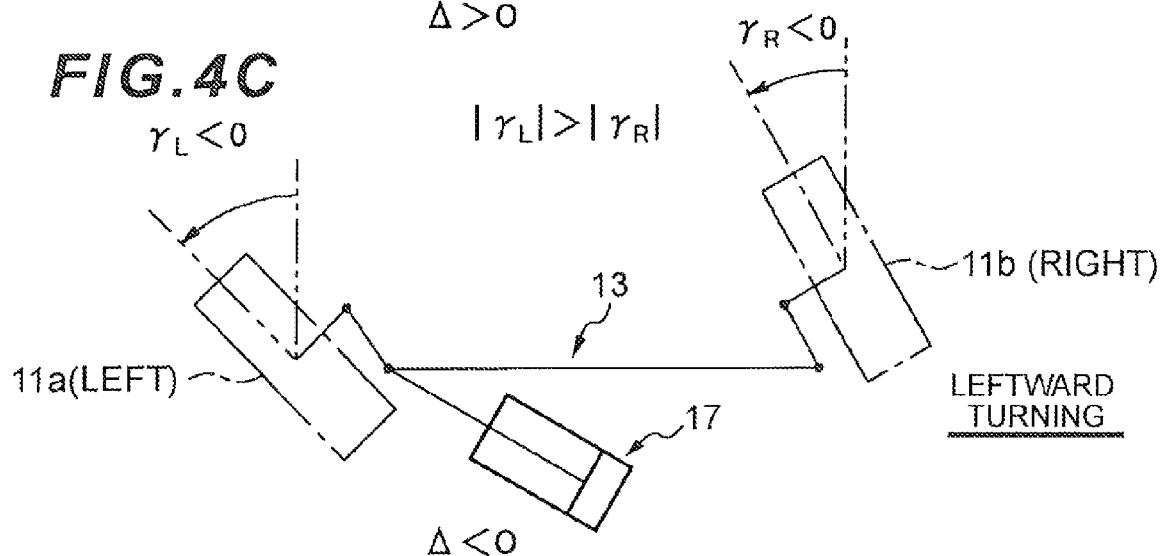

The steering dial 42 is connected through a steering device to the left and right front wheels 11a, 11b to steer the vehicle (refer to FIG. 3). The steering device comprises a steering mechanism 13, which is linked to the front wheels 11a, 11b, a steering cylinder (hydraulic cylinder) 17, which drives the steering mechanism 13 to change the steering angles $\gamma_L$, $\gamma_R$ of the front wheels 11a, 11b, (refer to FIG. 4, which describes the deflection-angles of the front wheels 11a, 11b with respect to the center line of the travel body 10 in the front and rear direction), steering angle detectors 61 (for example, potentiometers), which are attached to the pair of left and right front wheels 11a, 11b, respectively, for finding the steering angles at the front wheels 11a, 11b, the above mentioned steering dial 42 for setting a target steering angle for the front wheels 11a, 11b, and a controller 50, which controls the operation of the steering cylinder 17 in correspondence to the turning of the steering dial 42.

As shown in FIG. 3, the steering mechanism 13 comprises a pair of knuckle arms 14, which, respectively, support the front wheels 11a, 11b pivotally around king pin shafts 15, and a tie rod 16, which connects the pair of knuckle arms 14 with joint pins P1. The steering angle detectors 61 are attached on the knuckle arms 14, respectively, for finding the steering angles at the left and right front wheels 11a, 11b, respectively, from the turning angles of the knuckle arms 14 around the king pin shafts 15. One end of the steering cylinder 17 is connected to the left knuckle arm 14 of the steering mechanism 13 with a joint pin P2 while the other end is connected to a cylinder connection point (not shown) of the travel body 10 with a joint pin P3.

With this configuration, in the steering device, the steering cylinder 17 is extended or contracted to swing the left front wheel 11a around the king pin shaft 15 and, simultaneously in the same direction, the right front wheel 11b, which is linked through the tie rod 16, thereby changing the steering angles at the front wheels (steering wheels) 11a, 11b. In other words, the steering cylinder 17 is extended to turn the left and right front wheels 11a, 11b rightward, and it is contracted to turn them leftward.

It is so designed that the pair of left and right front wheels 11a, 11b create a difference between their angles with respect to the travel body 10 when they are turned in the steering of the travel body 10 by the steering mechanism 13 (specifically, the angle of the wheel that happens to be positioned inward in the turning always becomes larger than that of the wheel positioned outward at a constant rate). Now, refer to FIG. 4 for the following explanation. When the steering cylinder 17 is not extended with zero extension ($\Delta=0$), the steering angles $\gamma_L$, $\gamma_R$ at the left and right front wheels 11a, 11b are both zero ($\gamma_L=0$, $\gamma_R=0$) (refer to FIG. 4A).

Here, the sign of the steering angles at the front wheels 11a, 11b is so defined that when the wheels are directed rightward, the values of their angles are positive, and when the wheels are directed leftward, the values are negative. When the extension $\Delta$ is a positive value ($\Delta>0$), the steering angles $\gamma_L$, $\gamma_R$ at the left and right front wheels 11a, 11b become also positive ($\gamma_L>0$, $\gamma_R>0$) (refer to FIG. 4B). In this shown state, because of the above mentioned characteristic of the steering mechanism 13, the relation between the steering angle $\gamma_L$ at the left front wheel 11a and the steering angle $\gamma_R$ at the right front wheel 11b is described as $|\gamma_L|<|\gamma_R|$. Likewise, when the extension $\Delta$ is a negative value ($\Delta<0$), the steering angles $\gamma_L$, $\gamma_R$ at the front wheels 11a, 11b become also negative ($\gamma_L<0$, $\gamma_R<0$) (refer to FIG. 4C. In this state, because of the characteristic of the steering mechanism 13, the relation between the steering angle $\gamma_L$ at the left front wheel 11a and the steering angle $\gamma_R$ at the right front wheel 11b is described as $|\gamma_L|>|\gamma_R|$.

Figure 6C:
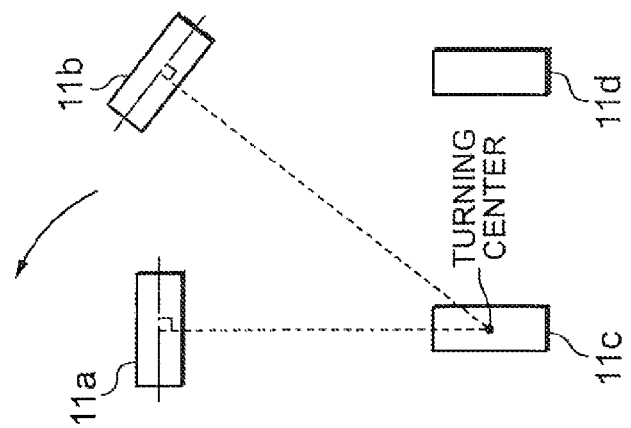
FIG. 6 are diagrams illustrating the movements of the wheels that correspond to the operational state of a steering dial, which is provided in the vehicle, FIG. 6A showing a turning center, FIG. 6B showing the state in the clockwise turning at the maximum steering angle, and FIG. 6C showing the state in the counter-clockwise turning at the maximum steering angle.
Figure 6B:
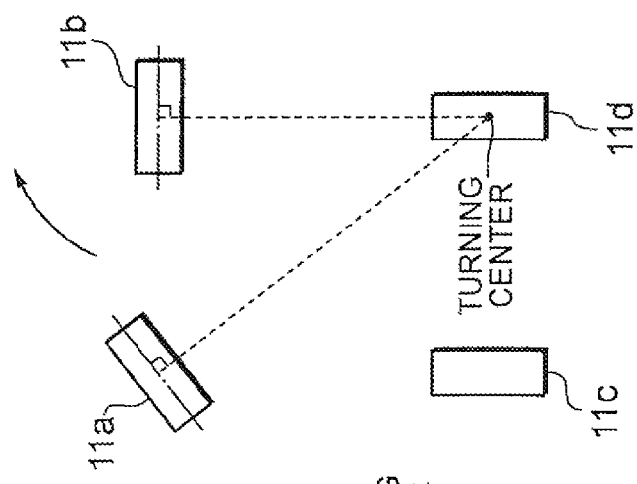
Figure 6A:
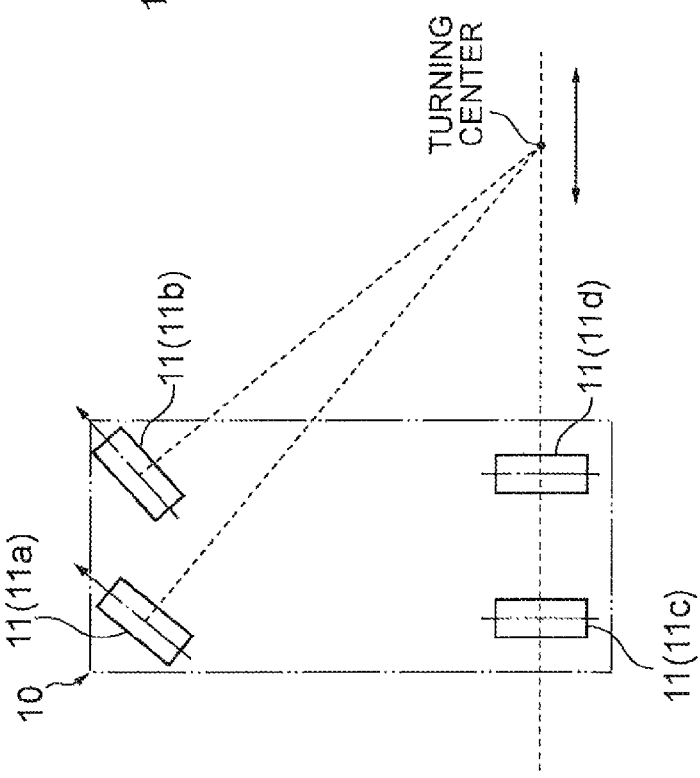

The center of the circle drawn by the turning of the aerial platform vehicle 1 always coincides approximately on the axis of the rear wheels 11c, 11d, and this center point moves from infinity to the rear wheels as the degree of the steering angle increases (zero steering angle=straight progression) (refer to FIG. 6A). In the present invention, the vehicle is so designed that when the maximum steering angle is applied in the rightward turning, the non-drive wheel on the right side (right rear wheel) 11d becomes the center for the turning circle (refer to FIG. 6B), and that if the turning is leftward at the maximum angle, then the non-drive wheel on the left side (left rear wheel) 11c becomes the center for the turning circle (refer to FIG. 6C).

Figure 2:
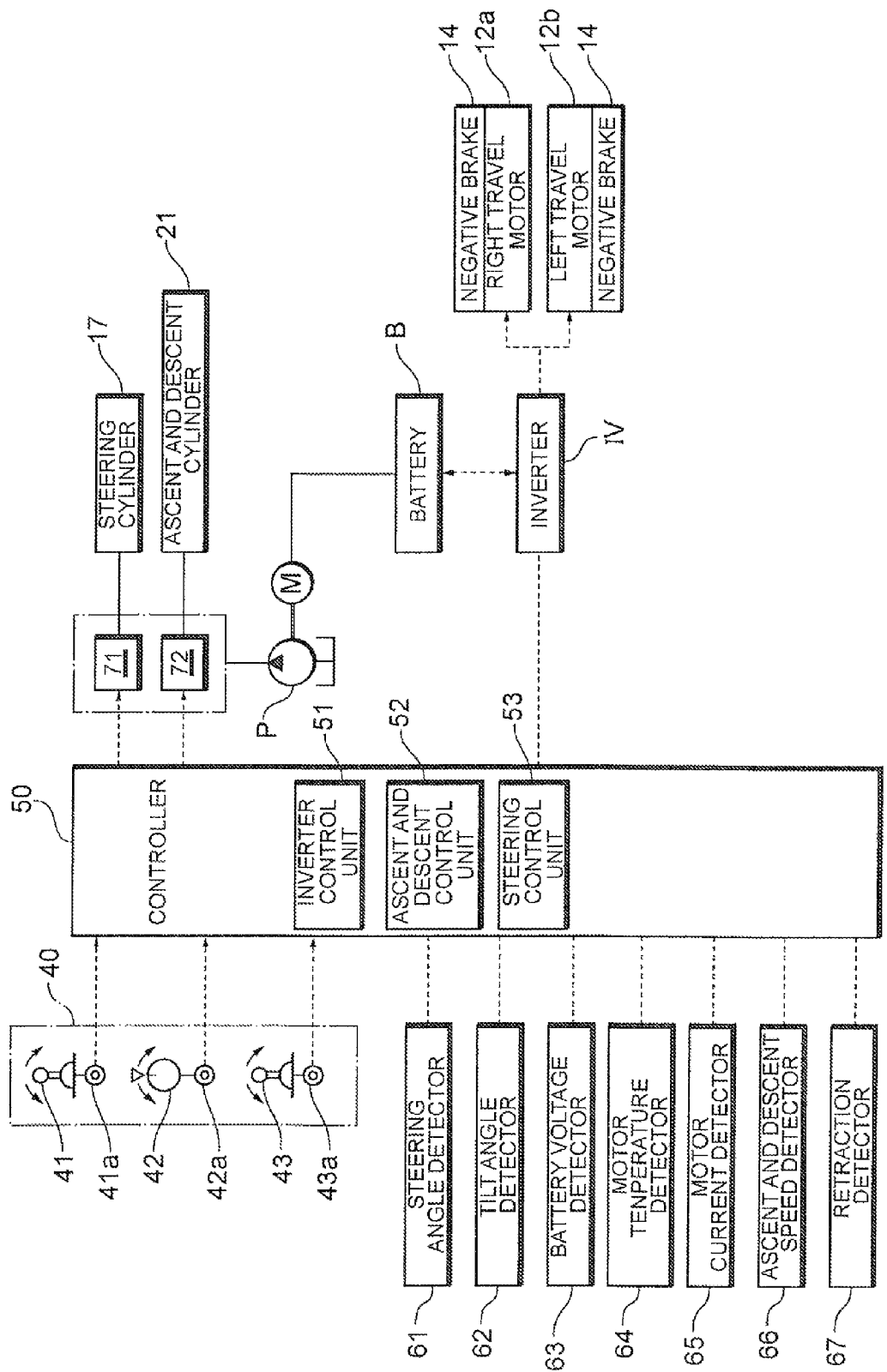
FIG. 2 is a diagram illustrating transmission paths for signals and movements involved in control of the traveling and steering of the travel body and the ascending and descending of the aerial platform in the vehicle.

Now, referring to FIG. 2, the travel control of the aerial platform vehicle 1, which has the above described configuration, is explained in relation to the operations of the levers and the dial provided on the control box 40. FIG. 2 shows transmission paths for signals and motions concerning the driving and steering of the travel body 10 and the lifting and lowering of the aerial platform 30.

The travel operation lever 41, which is provided on the control box 40 of the aerial platform 30, takes its neutral position (upright position shown in FIG. 5) when it is not operated. From the neutral position as reference, the travel operation lever 41 is tilted forward or backward, and if the worker operating the lever releases it from his hand, it automatically returns from the tilted position to the neutral position by the force of a built-in spring. The operational state (the direction and degree of the tilting with respect to the non-operational state as neutral position) of the travel operation lever 41 is detected by a move and stop operation detector 41a, which comprises, for example, a potentiometer, provided in the control box 40. The information of the operational state of the travel operation lever 41 detected by the move and stop operation detector 41a is input to the inverter control unit 51 of the controller 50 (provided in the aerial platform 30 or in the travel body 10).

The tilting forward of the travel operation lever 41 from the neutral position corresponds to a command that makes the travel body 10 move forward. The larger the tilting angle of the operation lever, the larger value is set for the travel speed forward by the inverter control unit 51 of the controller 50. On the other hand, the tilting backward of the travel operation lever 41 from the neutral position corresponds to a command that makes the travel body 10 move backward. The larger the tilting angle of the operation lever, the larger value is set for the travel speed backward by the inverter control unit 51 of the controller 50. In this embodiment, in either case where the travel operation lever 41 is tiled forward or backward (i.e., the lever is operated either for forward drive or for rearward drive), the speed of the vehicle is varied continuously without any step by the inverter control unit 51. In other words, the travel body 10 travels smoothly with its speed being continuously varied either in forward drive or in rearward drive. In addition, the returning of the travel operation lever 41 to the neutral position corresponds to a command that stop the travel body 10.

Figure 5:
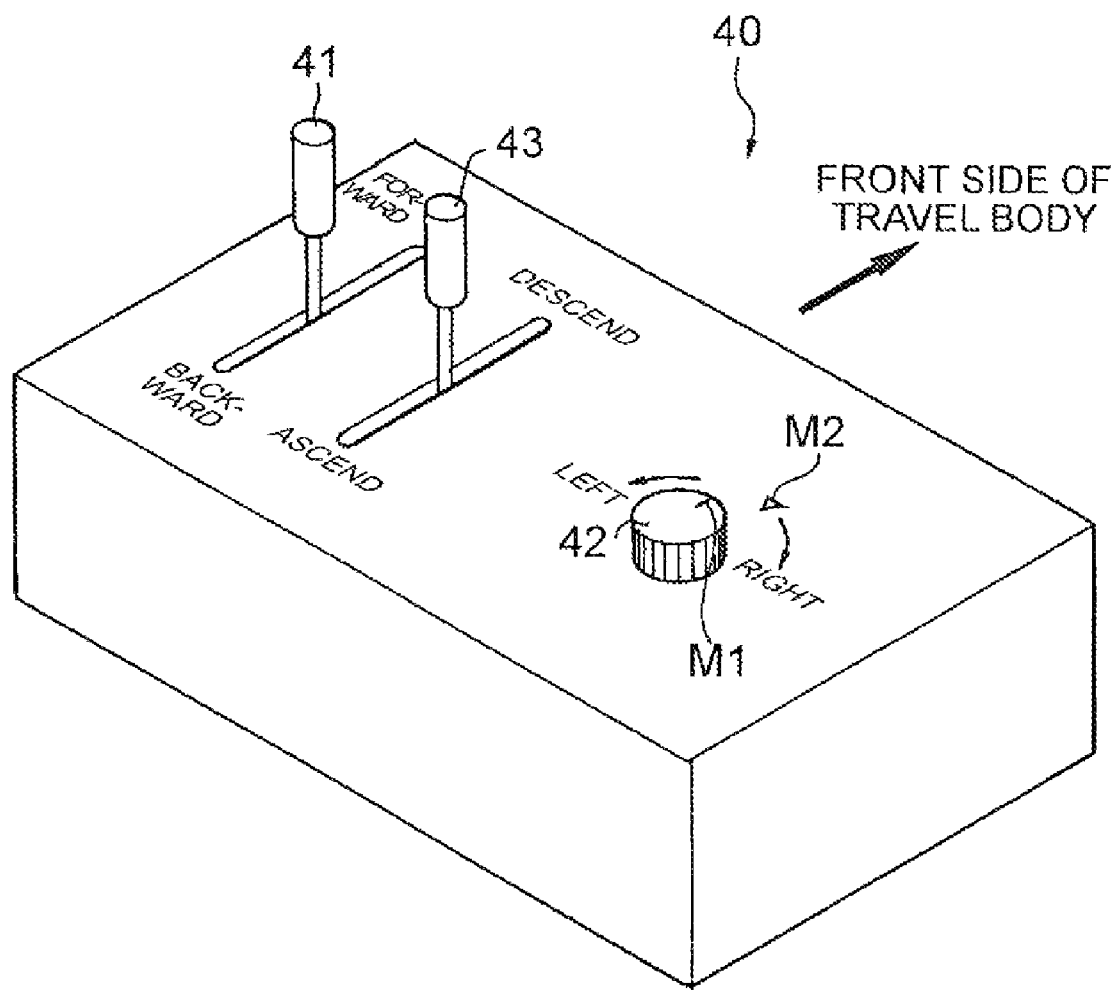
FIG. 5 is a perspective view of a control box, which is provided on the aerial platform of the vehicle.

The steering dial 42 takes its neutral position (the position where mark M1 provided on the steering dial 42 meets mark M2 provided on the control box 40 as shown in FIG. 5) when it is not operated. From the neutral position, the steering dial is turned rightward (clockwise) or leftward (counterclockwise), and if the worker operating the dial releases it, it automatically returns to the neutral position by the force of a built-in spring. The operational state of the steering dial 42 (the direction and degree of the turning operation from the neutral position as reference) is detected by a steering operation detector 42a, which comprises, for example, a potentiometer, provided in the control box 40. The operational information of the steering dial 42 detected by the steering operation detector 42a is input to the steering control unit 53 of the controller 50.

The clockwise turning of the steering dial 42 corresponds to a command that directs the front wheels 11a, 11b rightward. The larger the degree of the rightward turning of the dial from its neutral position, the larger value is set for the rightward target steering angle by the steering control unit 53 of the controller 50. On the other hand, the counterclockwise turning of the steering dial 42 corresponds to a command that directs the front wheels 11a, 11b leftward. The larger the degree of the leftward turning of the dial from its neutral position, the larger value is set for the leftward target steering angle by the steering control unit 53 of the controller 50. In addition, the returning of the steering dial 42 to its neutral position corresponds to a command that makes the steering angles at the front wheels 11a, 11b to zero (refer to FIG. 4A, where $\gamma_L=\gamma_R=0$).

The ascent and descent operation lever 43 takes its neutral position (upright position as shown in FIG. 5) when it is not operated. From the neutral position as reference, the ascent and descent operation lever 43 is tilted forward or backward, and if the worker operating the lever releases it, the lever automatically returns to the neutral position by the force of a built-in spring. The operational state of the ascent and descent operation lever 43 (the direction and degree of the tilting of the lever with respect to the neutral position) is detected by an ascent and descent operation detector 43a, which comprises a potentiometer, provided in the control box 40. The information of the operational state of the ascent and descent operation lever 43 detected by the ascent and descent operation detector 43a is input to the ascent and descent control unit 52 of the controller 50.

The tilting forward of the ascent and descent operation lever 43 from its neutral position corresponds to a command that lowers the aerial platform 30. The larger the degree of the tilting, the larger value is set for the target lowering speed by the ascent and descent control unit 52 of the controller 50. On the other hand, the tilting backward of the ascent and descent operation lever 43 from its neutral position corresponds to a command that lifts the aerial platform 30. The larger the degree of the tilting, the larger value is set for the target lifting speed by the ascent and descent control unit 52 of the controller 50. Furthermore, the returning of the ascent and descent operation lever 43 to the neutral position corresponds to a command that stops the movement of the aerial platform 30.

The travel body 10 houses two travel motors (induction motors) 12a, 12b, a battery B, and an inverter IV. The travel motors are for driving a pair of left and right drive wheels 11a, 11b, with each motor independently driving a respective drive wheel. For powering the motors, the inverter IV converts the DC power being supplied from the battery B to AC power, which is then supplied to the travel motors 12a, 12b (refer to FIG. 2). The inverter control unit 51 of the controller 50 controls the operation of the inverter IV such that the travel motors 12a, 12b rotate together at the rotational speed and in the direction that corresponds to the operational state of the travel operation lever 41. As a result, the worker on the aerial platform 30 can control the start and stop, the travel directions (forward or rearward) and the traveling speed of the travel body 10 by operating the travel operation lever 41.

The travel body 10 also houses a hydraulic pump P, which is driven by an electric motor M as drive source (refer to FIG. 2). Part of the pressured oil discharged from the hydraulic pump P is supplied through a steering control valve 71 to the above mentioned steering cylinder 17 (refer to FIG. 4), and the steering control unit 53 of the controller 50 drives electromagnetically the spool (not shown) of the steering control valve 71 to the position and in the direction that corresponds to the operational state of the steering dial 42. As a result, the worker on the aerial platform 30 can control the extension and contraction of the steering cylinder 17 by operating the steering dial 42, and thereby, can control the direction of the front wheels 11a, 11b that steer the travel body 10.

Other part of the pressured oil discharged from the hydraulic pump P is supplied through an ascent and descent control valve 72 to the above mentioned ascent and descent cylinder 21, and the controller 50 drives electromagnetically the spool (not shown) of the ascent and descent control valve 72 to the position and in the direction that corresponds to the operational state of the ascent and descent operation lever 43. As a result, the worker on the aerial platform 30 can control the extension and contraction of the ascent and descent cylinder 21 by operating the ascent and descent operation lever 43, and thereby, can control the lifting and lowering of the aerial platform 30.

The travel body 10 is provided with a steering angle detector 61, a tilt angle detector 62, a battery voltage detector 63, a motor temperature detector 64 and a motor current detector 65. The steering angle detector 61 detects the steering angles at the pair of left and right front wheels 11a, 11b as the rotational angles around the king pin shafts 15 of the front wheels 11a, 11b, and the tilt angle detector 62 detects the tilt angle of the travel body 10. The battery voltage detector 63 detects the voltage of the battery B; the motor temperature detector 64 detects the temperatures of the windings of the travel motors 12a, 12b; and the motor current detector 65 detects electrical currents through the travel motors 12a, 12b. In addition, the scissors-linkage 20 is provided with an ascent and descent speed detector 66 and a retraction detector 67. The ascent and descent speed detector 66 detects the ascending and descending speed of the aerial platform 30 from the operational speed of the ascent and descent cylinder 21, and the retraction detector 67 detects if the scissors-linkage 20 is retracted on the travel body 10. All the information detected by these detectors 61-67 is input to the controller 50.

The controller 50 comprises the inverter control unit 51, the steering control unit 53 and the ascent and descent control unit 52.

The inverter control unit 51 controls the operation of the inverter IV so that the two travel motors 12a, 12b rotate together at the rotational speed (i.e., velocity) that corresponds to the operational state of the travel operation lever 41 (i.e., the direction and degree of the tilt from the neutral position), which is detected by the move and stop operation detector 41a. In addition, if it is determined that a steering operation is being carried out, from the information detected by the steering angle detector 61 (for example, if the steering angles of the drive wheels 11a, 11b have become equal to or larger than a predetermined angle), then the inverter control unit 51 executes power control (so-called re-boost control) of the travel motors 12a, 12b through the inverter IV, so that these motors acquire a gradually changing output torque characteristic in correspondence to their rotational speed.

Figure 7:
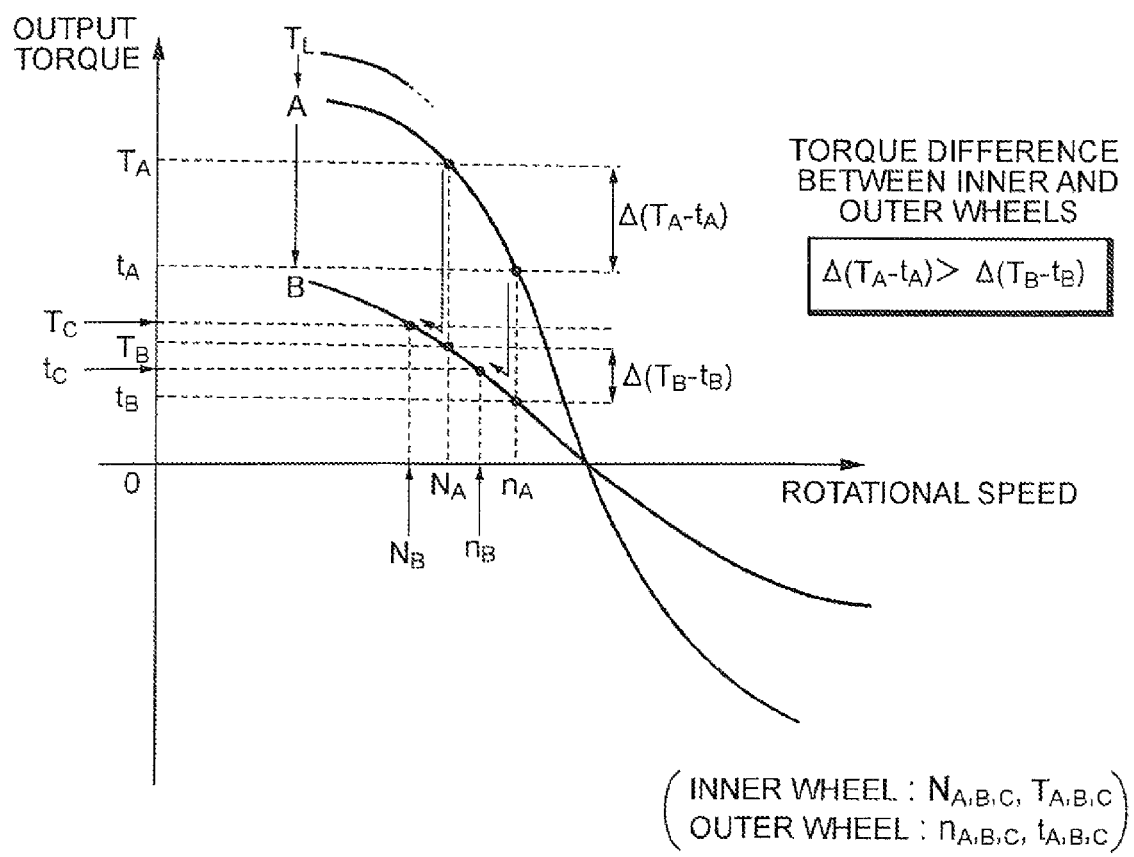
FIG. 7 is a graph showing changing travel torque characteristics over a range of rotational speed of the travel motor, the vertical axis representing the torque output of the travel motor while the horizontal axis representing the rotational speed of the travel motor.

More specifically, the inverter control unit 51 performs power control (re-boost control) of the travel motors 12a, 12b through the inverter IV in correspondence to the steering angles of the drive wheels 11a, 11b detected by the steering angle detector 62, and the inverter control unit 51 makes the torque output of the travel motors 12a, 12b over their corresponding range of rotational speed, more gradually changing as the rotational difference becomes larger between the inwardly and outwardly positioned drive wheels 11a, 11b (i.e., the torque curve is more flattened from A to B as shown in FIG. 7).

Now, the re-boost control mentioned above is explained in reference to FIG. 7. When the re-boost control is executed during the steering, in other words, when the slope of the torque curve is made more gradual as indicated by "A→B" in FIG. 7, the torque output of the inner wheel and that of the outer wheel are reduced, respectively, $T_A \to T_B$ and $t_A \to t_B$ while the rotational speeds of the inner and outer wheels remains at $N_A$ and $n_A$, respectively. As a result, the difference in torque between the inner wheel and the outer wheel has become smaller ($\Delta(T_A-t_A)>\Delta(T_B-t_B)$). This condition improves drive efficiency. However, because the resistance to the travel motion does not change, the speed of the vehicle falls, with the rotational speeds of the inner and outer wheels, respectively, falling as indicated in the figure, $N_A \rightarrow N_B$ and $n_A \rightarrow n_B$. Then, since the power of the travel motors 12a, 12b is constant, the torque outputs of the inner and outer wheels increase as $T_B \rightarrow T_C$ and $t_B \rightarrow t_C$, and along with the torque increase, the speed of the vehicle start to increase up to a point where there is a balance between the torque outputs $T_C$, $t_C$ of the inner and outer wheels and the travel resistance. By the way, in the present invention, the difference in rotational speed between the inner and outer wheels of the drive wheels 11a, 11b becomes largest when the steering angle reaches 45 degrees, and at this angle, the re-boost control, which controls the travel motors 12a, 12b through the inverter IV, is executed such that the curve depicting the output torque characteristic of the travel motors 12a, 12b over a range of rotational speed is made most gradual. As described above, the aerial platform vehicle 1 according to the present invention can perform a smooth turning, though its travel speed decreases from that in linear travel, because the difference in torque between the inner and outer wheels is made smaller during the steering. In addition, as the drive efficiency improves, the vehicle can be driven in an energy-saving manner, contributing to a reduction in power consumption from the battery. The curved lines shown in the graph in FIG. 7 exaggerate real changes that take place, to depict what has been described above.

Furthermore, the inverter control unit 51 is provided, in advance, with four inverter control patterns A-D, which are described in FIG. 9, and the inverter control unit selects and executes one of the control patterns in correspondence to the tilt angle of the travel body 10 and the retraction state of the scissors-linkage 20.

Pattern A is for a condition where the tilt angle of the travel body 10 detected by the tilt angle detector 62 is smaller than a predetermined angle, and the retracted state of the scissors-linkage 20 is detected by the retraction detector 67. In this control pattern, the inverter control unit 51 sets, as command frequency, the frequency that has been increased from zero as initial value in correspondence to the increased travel command value.

Pattern B is for a condition where the tilt angle of the travel body 10 detected by the tilt angle detector 62 is equal to or larger than the predetermined angle, and the retracted state of the scissors-linkage 20 is detected by the retraction detector 67. In this pattern, the inverter control unit 51 sets, as command frequency, the frequency that has been increased in correspondence to the increased travel command value, from the minimum frequency that generates a torque necessary for preventing the travel body 10 from deviating, as initial value, which torque is predetermined in correspondence to the tilt angle of the travel body 10.

Moreover, in control patterns A and B, the inverter control unit 51 sets the command frequency such that this frequency does not exceed the maximum frequency that generates the torque necessary for preventing the travel body 10 from deviating, which torque is predetermined in correspondence to the tilt angle of the travel body 10, regardless of the operational state of the travel operation lever 41.

Pattern C is for a condition where the tilt angle of the travel body 10 detected by the tilt angle detector 62 is smaller than the predetermined angle, and the retracted state of the scissors-linkage 20 is not detected by the retraction detector 67. In this pattern, the inverter control unit 51 sets, as command frequency, the frequency that has been increased from zero as initial value in correspondence to the increased travel command value. However, if the command frequency happens to exceed a predetermined frequency, then the command frequency is set not to exceed the predetermined frequency, regardless of the operational state of the travel operation lever 41.

Pattern D is for a condition where the tilt angle of the travel body 10 detected by the tilt angle detector 62 is equal to or larger than the predetermined angle, and the retracted state of the scissors-linkage 20 is not detected by the retraction detector 67. In this control pattern, the inverter control unit 51 restricts the operation of the inverter IV.

In addition to these control patterns, the inverter control unit 51 has a so-called cutback function. While the vehicle is traveling over a sloped ground, if the voltage of the battery B becomes lower than a predetermined value or higher than a predetermined value, or if the temperature of the windings of the travel motors 12a, 12b becomes higher than a predetermined value, then the inverter control unit 51 restricts the frequency set on the basis of the travel command value, by a cutback rate that is based on these detected values, and the inverter control unit sets this restricted frequency as command frequency, thereby maintaining the torque outputs of the motors and preventing the vehicle from deviating.

More specifically, if the tilt angle of the travel body 10 detected by the tilt angle detector 62 is equal to or larger than a predetermined angle, and if the retracted state of the scissors-linkage 20 is detected by the retraction detector 67, and if the voltage of the battery B detected by the battery voltage detector 63 is out of an allowable range of voltage value, then the inverter control unit 51 restricts the frequency that is set on the basis of the travel command value, in correspondence to the detected voltage value of the battery B, and the inverter control unit sets this restricted frequency as command frequency.

Figure 10:
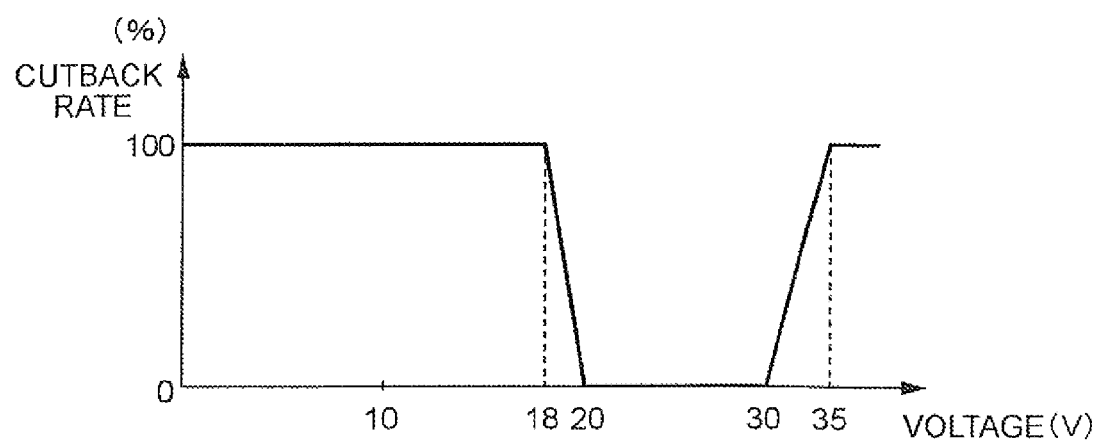
FIG. 10 is a graph describing the relation between the cutback rate and the voltage reading of the battery.

For example, the allowable voltage values are set as equal to or higher than 20 volts and lower than 30 volts. If the voltage of the battery is within the allowable range, then, as shown in FIG. 10, the cutback rate is set at 0% (in this case, the frequency set on the basis of the travel command value is set as command frequency). If the voltage is out of the allowable range, and the detected value is higher than 0 but lower than 18 volts or is equal to or higher than 35 volts, then the cutback rate is set to 100%. If the voltage is out of the allowable range, and the detected value is in the range equal to or higher than 18 volts but lower than 20 volts, then the cutback rate is set to decrease from 100% as initial value, as the detected value increases, and if the detected value is in the range equal to or higher than 30 volts but lower than 35 volts, then the cutback rate is set to increase from 0% as initial value, as the detected value increases. The inverter control unit 51 restricts the frequency set on the basis of the travel command value, in correspondence to the cutback rate determined in the above described ways, and sets this restricted frequency as command frequency.

In addition, if the tilt angle of the travel body 10 detected by the tilt angle detector 62 is equal to or larger than a predetermined angle, and if the retracted state of the scissors-linkage 20 is detected by the retraction detector 67, and if the temperature of the windings of the travel motors 12a, 12b detected by the motor temperature detector 64 is higher than a predetermined allowable limit, then the inverter control unit 51 restricts the frequency set on the basis of the travel command value, in correspondence to the detected temperature of the windings of the travel motors 12a, 12b, and the inverter control unit sets this restricted frequency as command frequency.

Figure 11:
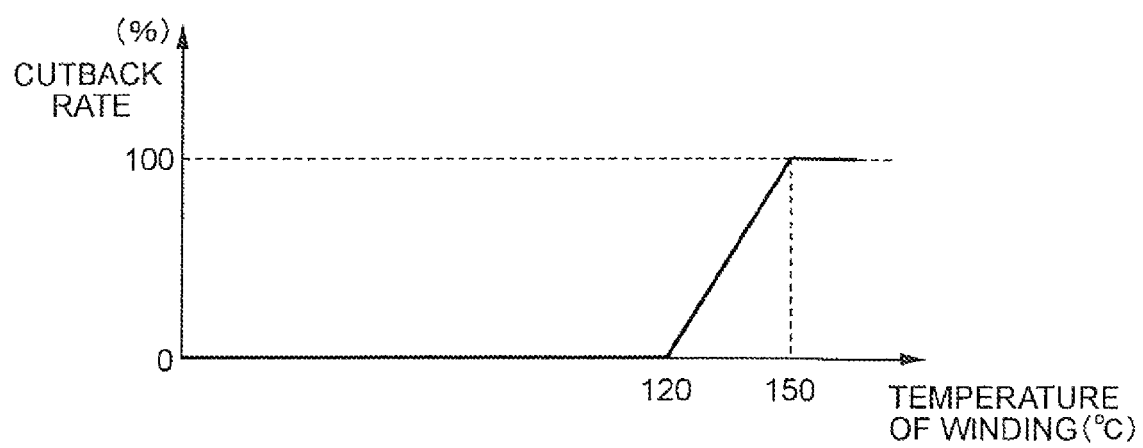
FIG. 11 is a graph describing the relation between the cutback rate and the temperature of the winding of the travel motor.

For example, the allowable temperature range is set as 0 degree to 120 degrees C. If the temperature of the windings is within the allowable range, then, as shown in FIG. 11, the cutback rate is set at 0% (in this case, the frequency set on the basis of the travel command value is set as command frequency). If the temperature is out of the allowable range, and the temperature of the windings is equal to or higher than 120 degrees but lower than 150 degrees C., then the cutback rate is set to a value that is proportional to the difference of the detected temperature from the upper limit of the allowable temperature (=120 degrees C.), with the value of 100% at 150 degrees C. and above. The inverter control unit 51 restricts the frequency set on the basis of the travel command value, in correspondence to the cutback rate determined in the above described ways, and sets this restricted frequency as command frequency.

After the above described cutback function has become effective, if the travel body 10 experiences a shortage of torque output, then the vehicle might recede over a sloped ground. To prevent such an accident, if the tilt angle of the travel body 10 detected by the tilt angle detector 62 is equal to or larger than a predetermined angle, and if the retracted state of the scissors-linkage 20 is detected by the retraction detector 67, and if the electrical current value of the travel motors 12a, 12b detected by the motor current detector 65 is smaller than a predetermined allowable limit, then the inverter control unit 51 stops the operation of the inverter IV. When the travel motors 12a, 12b stop operating, the negative brakes 14, which are attached to these motors 12a, 12b, are activated.

Figure 12A:
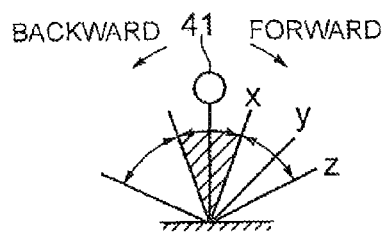
FIG. 12A is a graph showing the control input by the travel operation lever.
Figure 12B:
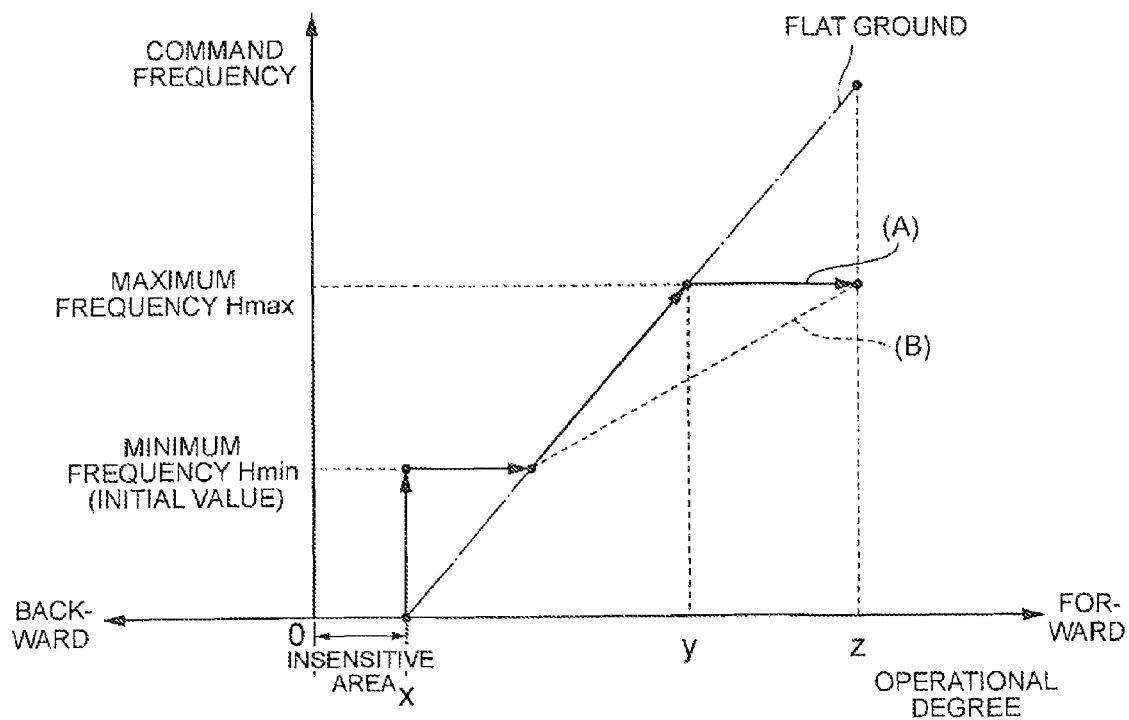
FIG. 12B is a graph describing the relation between the control input and the corresponding command frequency output from the inverter control unit.

Now, the relation between the degree of the tilting (i.e., the is operational degree) of the travel operation lever 41 and the command frequency output by the inverter control unit 51 is described in reference to FIG. 12. The travel operation lever 41 is tilted from its upright neutral position, through an insensitive area, which is indicated by a shaded section in FIG. 12A, to operational degree x, then to operational degree y and up to operational degree z. In the graph shown in FIG. 12B, solid line represents the command frequency that is set with the travel operation lever 41 in a condition where the tilt angle of the travel body 10 detected by the tilt angle detector 62 is equal to or larger than a predetermined angle, and the retracted state of the scissors-linkage 20 is detected by the retraction detector 67 (i.e., the vehicle is traveling over a sloped ground). As a contrast, the graph in FIG. 12B also includes an alternate long and short dash line that represents the command frequency that is set with the travel operation lever 41 in a condition where the tilt angle of the travel body 10 detected by the tilt angle detector 62 is smaller than the predetermined angle, and the retracted state of the scissors-linkage 20 is detected by the retraction detector 67 (i.e., the vehicle is traveling over a flat ground).

As shown in FIGS. 12A and 12B, while the vehicle is traveling over a sloped ground, if the travel operation lever 41 is tilted, through the insensitive area to operational degree x, then the command frequency is set at the minimum frequency Hmin that generates the torque necessary for preventing the travel body 10 from deviating, which torque is predetermined in correspondence to the tilt angle of the travel body 10. If the travel operation lever 41 is tilted further, then with the minimum frequency Hmin as initial value, the command frequency is set to the frequency that has been increased in correspondence to the increased travel command value, i.e., the increased degree of the tilting operation. When the tilting of the travel operation lever 41 reaches operational degree y, the command frequency to be set becomes the maximum frequency Hmax that generates the torque necessary for preventing the travel body 10 from deviating, which torque is predetermined in correspondence to the tilt angle of the travel body 10. After this point, even if the travel operation lever 41 is further tilted from operational degree y to operational degree z, the command frequency is set and maintained at the maximum Hmax, never to exceed it, for maintaining the torque output of the travel motors 12a, 12b to prevent the vehicle from deviating over a sloped ground.

The relation between the tilting of the travel operation lever 41 and the command frequency output by the inverter control unit 51 is not limited by what is described above. For example, after the initial value is set, the command frequency may be set in proportion to the operational degree of the travel operation lever 41 as represented by dotted line (B) in the graph of FIG. 12B. With this arrangement, the aerial platform vehicle 1 can run smoothly.

The steering control unit 53 receives the information of the operational state (the direction and degree of the turning from the neutral position) of the steering dial 42, which information is detected by the steering operation detector 42a. Based on the information, the steering control unit 53 sets a target steering angle for one of the front wheels whose side corresponds to the detected operational state of the steering dial 42, and controls the steering control valve 71 and thereby the extension of the steering cylinder 17 in accordance with the characteristic of the steering mechanism 13, so that the steering angle detected by the steering angle detector 61 provided at the front wheel on the turning side comes to the target steering angle.

Furthermore, the steering control unit 53 controls the operation of the steering cylinder 17 in consideration of the characteristic of the steering mechanism 13. Specifically, when the steering dial 42 is operated for the travel body 10 to take a right turn, the steering control unit directs the pair of left and right drive wheels 11a, 11b such that the left and right drive wheels, respectively, take circular paths, the centers of whose circles are located at the right side non-drive wheel (right rear wheel) 11d (refer to FIG. 6B). On the other hand, when the steering dial 42 is operated for the travel body 10 to take a left turn, the steering control unit directs the pair of left and right drive wheels 11a, 11b such that the left and right drive wheels, respectively, take circular paths, the centers of whose circles are located at the left side non-drive wheel (left rear wheel) 11c (refer to FIG. 6C).

The ascent and descent control unit 52 receives the information of the operational state (the direction and degree of the tilting from the neutral position) of the ascent and descent operation lever 43, which information is detected by the ascent and descent operation detector 43a. Based on the information, the ascent and descent control unit 52 sets a target ascending or descending speed for the aerial platform 30 in correspondence to the detected operational state of the ascent and descent operation lever 43, and shifts the spool of the ascent and descent control valve 72 and thereby controls the operational speed of the ascent and descent cylinder 21, so that the ascending or descending speed of the aerial platform 30 detected by the ascent and descent speed detector 66 comes to the target ascending or descending speed.

Now, the explanation proceeds to how the aerial platform vehicle 1, which is equipped with the above described controller, is used for work at elevated locations. At first, a worker boards the aerial platform 30 while the scissors-linkage 20 is retracted on the travel body 10. Then, he operates the travel operation lever 41 and the steering dial 42 on the control box 40, which operation directs and drives the left and right steering drive wheels 11a, 11b, so that the aerial platform vehicle 1 is moved to a site where work is to be performed.

During the travel, while the tilt angle of the travel body 10 is smaller than a predetermined angle (i.e., the vehicle is traveling over a flat ground), the inverter control unit 51 selects and executes control pattern A (refer to FIG. 9). In this control pattern, the command frequency increases in correspondence to the increased degree of the tilting of the travel operation lever 41 (refer to FIG. 12B), which results in the corresponding increase in the vehicle speed.

During the travel, if the tilt angle of the travel body 10 becomes larger than the predetermined angle (i.e., the vehicle is traveling over a sloped ground), then the inverter control unit 51 selects and executes control pattern B (refer to FIG. 9). In this control pattern, the command frequency is set to the frequency that has been increased in correspondence to the increased travel command value, from the minimum frequency that generates a torque necessary for preventing the travel body 10 from deviating, as initial value, which torque is predetermined in correspondence to the tilt angle of the travel body 10 (refer to FIG. 12B). As a result, the travel body 10 never skids over the sloped ground even if the travel operation lever 41 is at its neutral position. Also, the vehicle speed can be increased (up to a predetermined upper limit) in correspondence to the increased degree of the tilting of the travel operation lever 41.

However, while the vehicle is traveling over a sloped ground, if the voltage of the battery B becomes lower or higher than a predetermined value, or if the temperature of the windings of the travel motor 12a, 12b becomes higher than a predetermined value, then the inverter control unit 51 initiates the above mentioned cutback function, in which the power to the travel motors 12a, 12b is restricted on the basis of the cutback rate that is predetermined in correspondence to the voltage value of the battery B or to the temperature value of the windings of the travel motors 12a, 12b, which values are subject to the cutback function.

Under the influence of the cutback function, if the electrical current value of the travel motors 12a, 12b becomes smaller than the lower limit of the allowable range that is predetermined in correspondence to the tilt angle of the vehicle, i.e., if it is not possible to keep a torque necessary for preventing the travel body 10 from deviating, which torque is predetermined in correspondence to the tilt angle of the travel body, then the inverter control unit 51 stops the operation of the inverter IV and thereby cuts power off to the travel motors 12a, 12b. In this instance, the negative brakes 14, which have been disengaged up to this point, are activated to stop the rotation of and lock the rotational shafts of the travel motors 12a, 12b. In this way, the aerial platform vehicle 1 according to the present embodiment is prevented from deviating over any sloped ground.

After the vehicle has reached the work site, the worker operates the ascent and descent operation lever 43 on the control box 40 to extend the ascent and descent cylinder 21 and thereby extend the scissors-linkage 20, so that the aerial platform 30 is brought to a desired elevation. If it is necessary to move the aerial platform vehicle 1 during the work, then the worker operates the travel operation lever 41 and the steering dial 42, which operation directs and drives the left and right steering drive wheels 11a, 11b, so that the vehicle is moved to a desired position.

In this instance, if the tilt angle of the travel body 10 is smaller than a predetermined angle (i.e., the vehicle is traveling over a flat ground), the inverter control unit 51 selects and executes control pattern C (refer to FIG. 9). In this control pattern, the command frequency is increased in correspondence to the increased degree of the tilting of the travel operation lever 41, which results in the corresponding increase in the vehicle speed. However, this is a travel over a flat ground without retraction of the scissors-linkage 20, so the speed of the vehicle needs to be relatively low for safety. Therefore, the upper limit of the command frequency is set lower, regardless of the operational degree of the operation lever 41.

Furthermore, if the scissors-linkage 20 is not retracted, then the vehicle is restrained from making a high speed travel or a travel over a sloped ground, to ensure safety for work at elevated positions. As a result, the vehicle is allowed to travel only at a low speed over a flat ground. Therefore, the torques to be generated by the travel motors 12a, 12b are relatively small, and the excitation currents provided to the motors are reduced accordingly in this embodiment. As a result, the consumption of electricity is cut down, avoiding inefficient use of the battery B and thereby extending the life of the battery B.

If the tilt angle of the travel body 10 becomes equal to or larger than a predetermined angle (i.e., the vehicle is traveling over a sloped ground), in other words, the vehicle is traveling over a sloped ground without retraction of the scissors-linkage 20, then the inverter control unit 51 selects and executes control pattern D (refer to FIG. 9). In this control pattern, the operation of the inverter IV is restrained not to allow movement of the travel body 10 for safety.

After the work is finished, the worker operates the ascent and descent operation lever 43 to retract the scissors-linkage 20 by contracting the ascent and descent cylinder 21, and thereby lowering the aerial platform 30 on the travel body 10. He or she, then, operates the travel operation lever 41 and the steering dial 42, making the inverter control unit 51 select and execute control pattern A or B to drive the left and right drive wheels 11a, 11b, so that the aerial platform vehicle 1 is taken to a garage.

In the above described embodiment, while the travel operation lever 41 is being operated, one inverter powers the two induction motors at an optimal rotational speed in correspondence to the operational degree of the travel operation lever 41. As a result, the aerial platform vehicle 1 according to the present invention, even though its system for controlling the motors is simple, avoids wasteful power consumption and extends the period of use of the aerial platform vehicle available on a single charge.

In addition, in this embodiment, while the steering dial 42 is being operated, the inverter control unit 51 controls the driving of the travel motors 12a, 12b through the inverter IV such that the output torque characteristic demonstrates a more gradual change with respect to the change in the rotational speed of the travel motors 12a, 12b. In this way, a reduction is made in the difference in torque between the inner and outer wheels, which difference arises from the difference in rotational speed during the vehicle's turning, resulting in a more energy-efficient travel of the vehicle. According to this design, while the steering dial 42 is being operated, the speed of the vehicle is reduced from that in linear travel as mentioned above. This is preferable for the sake of safety. However, in this instance, the aerial platform vehicle 1 can be accelerated by further tilting the travel operation lever 41 for compensating the speed reduction that occurs during the steering.

In the above described embodiment, the travel operation lever 41 (travel-operating means), which is used for controlling the forward or rearward driving of the travel body 10, and the steering dial 42 (steering-operating means), which is used for controlling the turning direction of the travel body 10, are provided separately. However, this embodiment is not limited to this. For example, only one tilting lever may be provided to be moved from its neutral position into forward, rearward, rightward and leftward directions, and into slanted or middle directions therebetween, for controlling the forward, rearward and turning movements in correspondence to the degree and direction of the tilting of the lever.

The present invention has been explained with respect to a preferred embodiment. However, the scope of the present invention is not limited by the above described embodiment. The embodiment can be modified or improved appropriately within the scope of the invention and without deviating from the essence of the invention.

Figure 13:
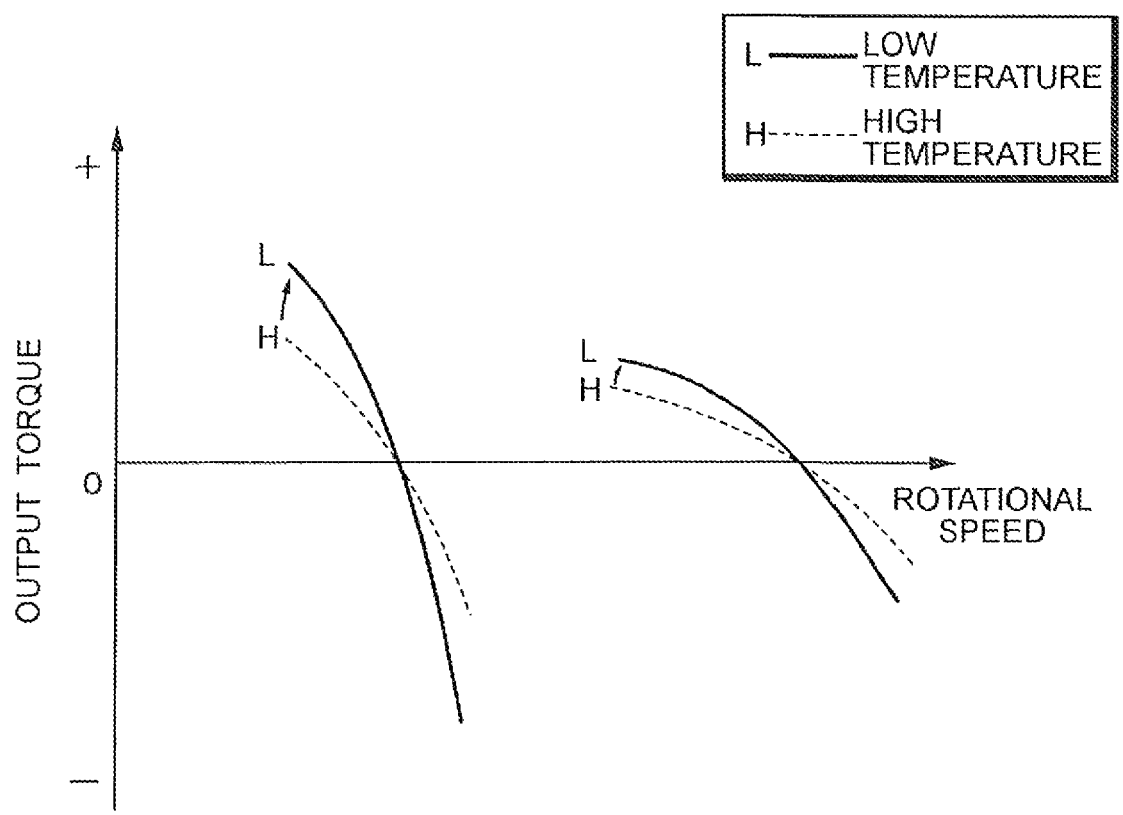
FIG. 13 is a graph showing output torque characteristics of the travel motor for its changing rotational speed, which characteristics depend on the temperature of the winding of the motor.

For example, the travel motors (induction motors) 12a, 12b used in the above embodiment can have a property that the output torque increases as the temperature of the windings becomes lower (refer to FIG. 13), and temperature-detecting means may be provided and attached to the two travel motors (induction motors) 12a, 12b. In this case, the lower the temperature of the windings of the travel motors 12a, 12b detected by the temperature-detecting means, the inverter control unit 51 can control the operation of the travel motors 12a, 12b through the inverter IV to achieve a more gradually changing output torque characteristic for the range in rotational speed of the travel motors. The addition of this arrangement can compensate the output torque characteristic for the rise that could have otherwise occurred because of a fall in the temperature of the windings of the travel motors 12a, 12b (as shown in FIG. 7, where the torque curve is shifted lower from $T_L$ to A). As a result, the operation of the travel motors 12a, 12b is controlled more accurately through the inverter IV during the steering, and the aerial platform vehicle 1 according to the present invention achieves an efficient drivability especially for the steering, contributing to energy saving for the battery B. By the way, in stead of the temperature of the windings of the motors 12a, 12b, ambient temperature may be applied in the same way.

What is claimed is:

1. A work vehicle comprising:
a travel body comprising wheels on its front and rear, and right and left sides, of which wheels, a front pair or a rear pair of right and left wheels are drive wheels;
a steering actuator, which drives a link mechanism that directs said pair of right and left drive wheels, and thereby changes steering angles at said drive wheels;
two induction motors, which independently drive said pair of right and left drive wheels, respectively;
a battery, which is used for supplying electric power to said two induction motors;
an inverter, which converts DC power from said battery to AC power and supplies the AC power to said two induction motors for driving both said two induction motors to rotate;
travel-operating means, which is operated for travel control of said travel body;
steering-operating means, which is operated to set a turning direction for said travel body;
steering-controlling means, which controls operation of said steering actuator such that the steering angles at said drive wheels correspond to operation of said steering-operating means;
inverter-controlling means, which controls operation of said inverter to rotate said induction motors at a speed that corresponds to the operation of said travel-operating means; and
steering-angle-detecting means, which detects the steering angles at said drive wheels, wherein
when a steering is detected by said steering-angle-detecting means, said inverter-controlling means controls the operation of said induction motors through said inverter such that said motors acquire a characteristic that their torque output changes more gradually than otherwise over a corresponding rotational speed change.

2. A work vehicle according to claim 1, wherein said inverter-controlling means controls the operation of said induction motors through said inverter such that said motors acquire a characteristic that their torque output changes more gradually over a corresponding rotational speed change as the difference in rotational speed between the inner and outer wheels of said drive wheels becomes larger, which difference corresponds to the steering angles at said drive wheels detected by said steering-angle-detecting means.

3. A work vehicle according to claim 2, further comprising temperature-detecting means, which detects the temperature of the windings of said induction motors, wherein
said inverter-controlling means controls the operation of said induction motors through said inverter such that said induction motors acquire a characteristic that their torque output changes more gradually over a corresponding rotational speed change as the temperature of the windings of said induction motors detected by said temperature-detecting means becomes lower.

4. A work vehicle according to claim 1, further comprising temperature-detecting means, which detects the temperature of the windings of said induction motors, wherein
said inverter-controlling means controls the operation of said induction motors through said inverter such that said induction motors acquire a characteristic that their torque output changes more gradually over a corresponding rotational speed change as the temperature of the windings of said induction motors detected by said temperature-detecting means becomes lower.

5. A work vehicle according to claim 1, further comprising:
tilt-angle-detecting means, which detects the tilt angle of said travel body; and
motor-temperature-detecting means, which detects the temperature of the windings of said induction motors; wherein
while the tilt angle detected by said tilt-angle-detecting means is equal to or larger than a predetermined angle, if the temperature of the windings of said induction motors detected by said motor-temperature-detecting means is higher than a predetermined upper limit for allowable temperature, then said inverter-controlling means restricts the rotation of said induction motors, whose operation is otherwise controlled in correspondence to the operation of said travel-operating means.

6. A work vehicle according to claim 5, wherein
said travel-operating means outputs a travel command value in correspondence to its operation; and
while the tilt angle detected by said tilt-angle-detecting means is equal to or larger than a predetermined angle, if the temperature of the windings of said induction motors detected by said motor-temperature-detecting means is higher than a predetermined upper limit for allowable temperature, then said inverter-controlling means restricts the frequency of alternating current that is set based on said travel command value, in correspondence to the detected temperature of the windings of said induction motors, and sets this restricted frequency as command frequency.

7. A work vehicle according to claim 6, further comprising:
an elevating device, which is provided on said travel body and is extended upward or contracted downward for realizing ascending and descending motions; and
retraction-detecting means, which detects whether said elevating device is retracted on said travel body or not; wherein
while the tilt angle detected by said tilt-angle-detecting means is equal to or larger than a predetermined angle, and while the retraction of the elevating device is detected by said retraction-detecting means, if the temperature of the windings of said induction motors detected by said motor-temperature-detecting means is higher than a predetermined upper limit for allowable temperature, then said inverter-controlling means restricts the frequency that is set based on said travel command value, in correspondence to the detected temperature of the windings of said induction motors, and sets this restricted frequency of the alternating current as command frequency.

8. A work vehicle according to claim 7, further comprising motor-current-detecting means, which detects electrical currents through said induction motors; wherein
while the tilt angle detected by said tilt-angle-detecting means is equal to or larger than a predetermined angle, if the electrical current value of said induction motors detected by said motor-current-detecting means is lower than a lower limit for allowable electrical current value, which limit is predetermined in correspondence to said tilt angle, then said inverter-controlling means stops the operation of said inverter.

9. A work vehicle according to claim 6, further comprising motor-current-detecting means, which detects electrical currents through said induction motors; wherein
while the tilt angle detected by said tilt-angle-detecting means is equal to or larger than a predetermined angle, if the electrical current value of said induction motors detected by said motor-current-detecting means is lower than a lower limit for allowable electrical current value, which limit is predetermined in correspondence to said tilt angle, then said inverter-controlling means stops the operation of said inverter.

10. A work vehicle according to claim 5, further comprising motor-current-detecting means, which detects electrical currents through said induction motors; wherein
while the tilt angle detected by said tilt-angle-detecting means is equal to or larger than a predetermined angle, if the electrical current value of said induction motors detected by said motor-current-detecting means is lower than a lower limit for allowable electrical current value, which limit is predetermined in correspondence to said tilt angle, then said inverter-controlling means stops the operation of said inverter.

11. A work vehicle according to claim 10, further comprising:
an elevating device, which is provided on said travel body and is extended upward or contracted downward for realizing ascending and descending motions; and
retraction-detecting means, which detects whether said elevating device is retracted on said travel body or not; wherein
while the tilt angle detected by said tilt-angle-detecting means is equal to or larger than a predetermined angle, and while the retraction of the elevating device is detected by said retraction-detecting means, if the electrical current value of said induction motors detected by said motor-current-detecting means is lower than a lower limit for allowable electrical current value, which limit is predetermined in correspondence to said tilt angle, then said inverter-controlling means stops the operation of said inverter.

12. A work vehicle according to claim 11, further comprising braking means, which stops movement of at least one of said front or rear pair of right and left wheels when said inverter-controlling means stops the operation of said inverter.

13. A work vehicle according to claim 10, further comprising braking means, which stops movement of at least one of said front or rear pair of right and left wheels when said inverter-controlling means stops the operation of said inverter.

14. A work vehicle according to claim 1, further comprising tilt-angle-detecting means, which detects the tilt angle of said travel body; wherein
said travel-operating means sets, in correspondence to its operation, a travel command value for said travel body;
said inverter-controlling means controls the operation of said inverter to rotate said induction motors at a speed that corresponds to the operation of said travel-operating means, by outputting to said two induction motors an alternating current at a command frequency that is set based on said travel command value;
said induction motors have a characteristic that their starting torque is relatively small in low frequency band;
while the tilt angle detected by said tilt-angle-detecting means is smaller than a predetermined angle, said inverter-controlling means sets as command frequency a frequency that has been increased from zero as initial value in correspondence to an increase in said travel command value; and
if the tilt angle detected by said tilt-angle-detecting means is equal to or larger than the predetermined angle, said inverter-controlling means sets as command frequency a frequency that has been increased in correspondence to an increase in said travel command value, from a minimum frequency that generates a torque necessary for preventing said travel body from deviating, as initial value, which torque is predetermined in correspondence to said tilt angle.

15. A work vehicle according to claim 14, wherein said inverter-controlling means sets said command frequency not to exceed a maximum frequency that generates a torque necessary for preventing said travel body from deviating, which torque is predetermined in correspondence to said tilt angle, regardless of the operation of said travel-operating means.

16. A work vehicle according to claim 14, further comprising:
an elevating device, which is provided on said travel body and is extended upward or contracted downward for realizing ascending and descending motions; and
retraction-detecting means, which detects whether said elevating device is retracted on said travel body or not; wherein
while the tilt angle detected by said tilt-angle-detecting means is smaller than a predetermined angle, and while the retraction of the elevating device is detected by said retraction-detecting means, said inverter-controlling means sets as command frequency a frequency that has been increased from zero as initial value in correspondence to an increase in said travel command value; and
if the tilt angle detected by said tilt-angle-detecting means becomes equal to or larger than the predetermined angle while the retraction of the elevating device is detected by said retraction-detecting means, said inverter-controlling means sets as command frequency a frequency that has been increased in correspondence to an increase in said travel command value, from a minimum frequency that generates a torque necessary for preventing said travel body from deviating, as initial value, which torque is predetermined in correspondence to said tilt angle.

* * * * *